United States Patent
Buitron

(10) Patent No.: US 7,600,359 B2
(45) Date of Patent: Oct. 13, 2009

(54) METHOD OF MERGING TWO DISKS CONCENTRICALLY WITHOUT GAP BETWEEN DISKS

(75) Inventor: Gerardo Buitron, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 745 days.

(21) Appl. No.: 10/435,360

(22) Filed: May 9, 2003

(65) Prior Publication Data

US 2004/0016214 A1 Jan. 29, 2004

Related U.S. Application Data

(60) Provisional application No. 60/378,972, filed on May 9, 2002, provisional application No. 60/417,668, filed on Oct. 10, 2002.

(51) Int. Cl.
*B65B 35/56* (2006.01)
*B65B 35/50* (2006.01)

(52) U.S. Cl. .............................. 53/446; 53/246; 53/532; 414/416.08

(58) Field of Classification Search ................. 53/446, 53/443, 475, 244, 246, 254, 532; 414/416.02, 414/416.07, 811, 791.6, 416.08; 206/711
See application file for complete search history.

(56) References Cited

U.S. PATENT DOCUMENTS

| | | | | |
|---|---|---|---|---|
| 3,382,647 A | * | 5/1968 | Davey et al. ................... | 53/532 |
| 3,505,777 A | * | 4/1970 | Tsutsumi ...................... | 53/168 |
| 4,573,851 A | | 3/1986 | Butler ......................... | 414/404 |
| 4,669,612 A | | 6/1987 | Mortensen .................. | 206/454 |
| 4,676,008 A | * | 6/1987 | Armstrong ................... | 34/237 |
| 4,694,778 A | * | 9/1987 | Learn et al. ................. | 118/728 |
| 4,695,217 A | | 9/1987 | Lau ............................ | 414/404 |
| 4,724,963 A | | 2/1988 | Mortensen .................. | 206/454 |
| 4,768,328 A | * | 9/1988 | Mims .......................... | 53/532 |
| 4,808,456 A | | 2/1989 | Yamada et al. | |
| 4,819,579 A | * | 4/1989 | Jenkins ....................... | 118/728 |
| 4,840,530 A | | 6/1989 | Nguyen ...................... | 414/404 |
| 4,856,957 A | * | 8/1989 | Lau et al. .................... | 414/404 |
| 4,939,891 A | * | 7/1990 | Podini ......................... | 53/496 |
| 4,947,624 A | * | 8/1990 | Cones et al. ................. | 53/540 |

(Continued)

FOREIGN PATENT DOCUMENTS

EP 0 177 073 8/1985

(Continued)

OTHER PUBLICATIONS

Australian Written Opinion and Search Report, Dec. 17, 2004, Singapore Application No. SG200302857-8.

(Continued)

*Primary Examiner*—Paul R Durand
(74) *Attorney, Agent, or Firm*—McCarthy Law Group

(57) ABSTRACT

A disk cassette is provided with opposed side walls having ribs configured to facilitate merging pairs of disks. In most instances, the disks will be single-sided hard memory disks. The final position of the disks in the disk cassette will be in spaced pairs, with the disks forming each pair being in surface-to-surface contact and, preferably, with the perimeter edge of each disk concentrically aligned.

20 Claims, 12 Drawing Sheets

U.S. PATENT DOCUMENTS

| | | | |
|---|---|---|---|
| 4,947,784 A | 8/1990 | Nishi | 414/404 |
| 4,949,848 A | 8/1990 | Kos | 211/41 |
| 4,955,471 A * | 9/1990 | Hirose et al. | 206/303 |
| 4,958,982 A | 9/1990 | Champet et al. | 414/751.1 |
| 4,962,879 A | 10/1990 | Goesele et al. | 228/116 |
| 4,981,222 A * | 1/1991 | Lee | 211/41.18 |
| 4,987,407 A | 1/1991 | Lee | 340/540 |
| 5,007,788 A | 4/1991 | Asano et al. | 414/416.09 |
| 5,111,936 A * | 5/1992 | Kos | 211/41.18 |
| 5,125,784 A | 6/1992 | Asano | 414/404 |
| 5,188,499 A | 2/1993 | Tarng et al. | 414/404 |
| 5,250,339 A | 10/1993 | Tani et al. | |
| 5,269,643 A | 12/1993 | Kodama et al. | 414/416 |
| 5,314,107 A * | 5/1994 | d'Aragona et al. | 228/116 |
| 5,348,151 A | 9/1994 | Dressen | 206/334 |
| 5,351,156 A | 9/1994 | Gregory et al. | |
| 5,430,992 A * | 7/1995 | Olson | 53/399 |
| 5,476,176 A | 12/1995 | Gregerson et al. | 206/711 |
| 5,478,622 A | 12/1995 | Nakamura et al. | |
| 5,486,134 A | 1/1996 | Jones et al. | 451/209 |
| 5,497,085 A | 3/1996 | Tian et al. | |
| 5,501,568 A | 3/1996 | Ono | 414/417 |
| 5,612,830 A | 3/1997 | Gregory et al. | |
| 5,620,295 A | 4/1997 | Nishi | 414/416.11 |
| 5,664,407 A * | 9/1997 | Cooper et al. | 53/542 |
| 5,665,478 A | 9/1997 | Suzuki et al. | |
| 5,773,124 A | 6/1998 | Ishikawa et al. | |
| 5,780,127 A | 7/1998 | Mikkelsen | 428/35.7 |
| 5,820,449 A | 10/1998 | Clover | 451/287 |
| 5,906,469 A | 5/1999 | Oka et al. | 414/416 |
| 5,926,352 A | 7/1999 | Murayama et al. | |
| 5,928,759 A | 7/1999 | Arita et al. | |
| 5,956,317 A | 9/1999 | Komiyama et al. | 369/286 |
| 5,976,255 A | 11/1999 | Takaki et al. | 118/500 |
| 5,991,104 A | 11/1999 | Bonyhard | |
| 6,007,896 A | 12/1999 | Bhushan | |
| 6,033,486 A | 3/2000 | Andros | |
| 6,033,522 A | 3/2000 | Iwata et al. | 156/345 |
| 6,086,961 A | 7/2000 | Bonyhard | |
| 6,107,599 A | 8/2000 | Baumgart et al. | 219/121.77 |
| 6,116,416 A * | 9/2000 | Hansen et al. | 206/308.3 |
| 6,117,570 A | 9/2000 | Chen et al. | |
| 6,120,890 A | 9/2000 | Chen et al. | |
| 6,150,015 A | 11/2000 | Bertero et al. | |
| 6,182,814 B1 * | 2/2001 | Koehler | 198/418.7 |
| 6,230,891 B1 * | 5/2001 | Usui et al. | 206/454 |
| 6,345,947 B1 | 2/2002 | Egashira | 414/225.01 |
| 6,354,794 B2 | 3/2002 | Sato et al. | 414/811 |
| 6,368,040 B1 | 4/2002 | Yamasaki et al. | 414/222 |
| 6,427,850 B2 | 8/2002 | Mendiola | 211/41.18 |
| 6,457,929 B2 | 10/2002 | Sato et al. | 414/404 |
| 6,498,086 B1 | 12/2002 | Zheng | |
| 6,582,279 B1 | 6/2003 | Fox et al. | 451/37 |
| 6,595,028 B1 | 7/2003 | Miyamoto et al. | |
| 6,596,083 B2 | 7/2003 | Cromwell et al. | |
| 6,612,801 B1 | 9/2003 | Koguchi | 414/416.02 |
| 6,625,835 B1 | 9/2003 | Frost et al. | 15/77 |
| 6,626,744 B1 | 9/2003 | White et al. | 451/66 |
| 6,664,503 B1 | 12/2003 | Hsieh et al. | |
| 6,769,855 B2 | 8/2004 | Yokomori et al. | 414/416.02 |
| 6,818,331 B2 | 11/2004 | Sakawaki et al. | |
| 6,821,653 B2 | 11/2004 | Fukushima et al. | |
| 6,926,977 B2 | 8/2005 | Osawa et al. | |
| 6,942,933 B2 | 9/2005 | Osawa | |
| 2001/0049031 A1 | 12/2001 | Bajorek et al. | |
| 2001/0053444 A1 | 12/2001 | Yokoyama et al. | |
| 2002/0006324 A1 | 1/2002 | Sato et al. | 414/416.12 |
| 2002/0054976 A1 | 5/2002 | Nakamura et al. | |
| 2002/0055017 A1 | 5/2002 | Fukushima et al. | |
| 2002/0081181 A1 | 6/2002 | Yokomori et al. | |
| 2002/0132043 A1 | 9/2002 | Cromwell et al. | |
| 2002/0142707 A1 | 10/2002 | Shimada et al. | |
| 2002/0159177 A1 | 10/2002 | Aoki et al. | |
| 2003/0082407 A1 | 5/2003 | Sakawaki et al. | |
| 2003/0104253 A1 | 6/2003 | Osawa et al. | |
| 2003/0179692 A1 | 9/2003 | Ohotomo | |
| 2003/0208899 A1 | 11/2003 | Grow et al. | 29/458 |
| 2003/0209389 A1 | 11/2003 | Buitron et al. | 184/6 |
| 2003/0209421 A1 | 11/2003 | Buitron et al. | 204/192.2 |
| 2003/0210498 A1 | 11/2003 | Kim et al. | 360/135 |
| 2003/0211275 A1 | 11/2003 | Buitron et al. | 428/64.1 |
| 2003/0211361 A1 | 11/2003 | Kim et al. | 428/694 R |
| 2004/0005481 A1 | 1/2004 | Osawa et al. | |
| 2004/0013011 A1 | 1/2004 | Valeri | 365/200 |
| 2004/0023074 A1 | 2/2004 | Shimizu et al. | |
| 2004/0035737 A1 | 2/2004 | Buitron et al. | 206/454 |
| 2004/0037005 A1 | 2/2004 | Osawa | |
| 2004/0068862 A1 | 4/2004 | Buitron et al. | 29/604 |
| 2004/0069662 A1 | 4/2004 | Buitron et al. | 206/307.1 |
| 2004/0070092 A1 | 4/2004 | Buitron et al. | 264/1.33 |
| 2004/0070859 A1 | 4/2004 | Crofton et al. | 360/1 |
| 2004/0071535 A1 | 4/2004 | Crofton et al. | 414/416.09 |
| 2004/0072029 A1 | 4/2004 | Lowery et al. | |
| 2004/0170870 A1 | 9/2004 | Yokoyama et al. | |
| 2005/0003106 A1 | 1/2005 | Isozaki | |
| 2005/0037140 A1 | 2/2005 | Sakawaki et al. | |
| 2005/0121839 A1 | 6/2005 | Fukushima et al. | |
| 2005/0132958 A1 | 6/2005 | Leng et al. | |

FOREIGN PATENT DOCUMENTS

| | | | |
|---|---|---|---|
| EP | 0 192 244 | 2/1986 | |
| EP | 768704 | 4/1997 | 414/416.02 |
| JP | 63122527 | 5/1988 | |
| JP | 04067333 | 3/1992 | |
| JP | 05028533 | 2/1993 | |
| JP | 06076384 | 3/1994 | |
| JP | 7-263521 | 10/1995 | 414/416.02 |
| JP | 07296418 | 11/1995 | |
| JP | 08249802 | 9/1996 | |
| JP | 08273210 | 10/1996 | |
| JP | 10228674 | 8/1998 | |
| JP | 11265506 | 9/1999 | |
| JP | 2001232667 | 8/2001 | |
| WO | WO 9836867 A1 | 8/1998 | |

OTHER PUBLICATIONS

Mar. 12, 2005 Invitation to Respond to Written Opinion from Intellectual Property Office of Singapore to Tan Jinhwee, Eunice & Lim Chooeng.

"Design of an active memory system for network applications"; Asthana, A.; Cravatts, M.; Krzyzanowski, P.; Memory Technology, Design and Testing, Aug. 8-9, 1994; p. 58-63.

Pang, S.I. et al., "Effects of Nitrogenated NiP Seedlayer on Co-Alloy Thin Film Media," 1494-96, IEEE Transactions on Magnetics, vol. 37, No. 4 (Jul. 2001).

Tsinberg, M. Eggrs, C., "DVD technology"; Image Processing, 1998 ICIP 98 Proceedings. 1998 Int'l Conf on vol. 1; Oct. 4-7, 1998, p. 2: 2 vol. 1.

US 5,762,201, 06/1998, Whalen (withdrawn)

* cited by examiner

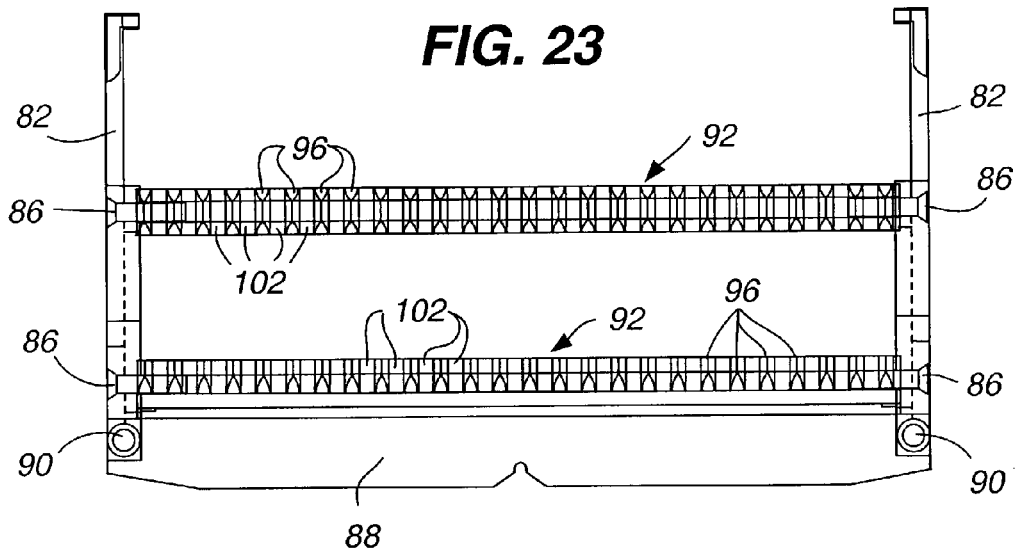
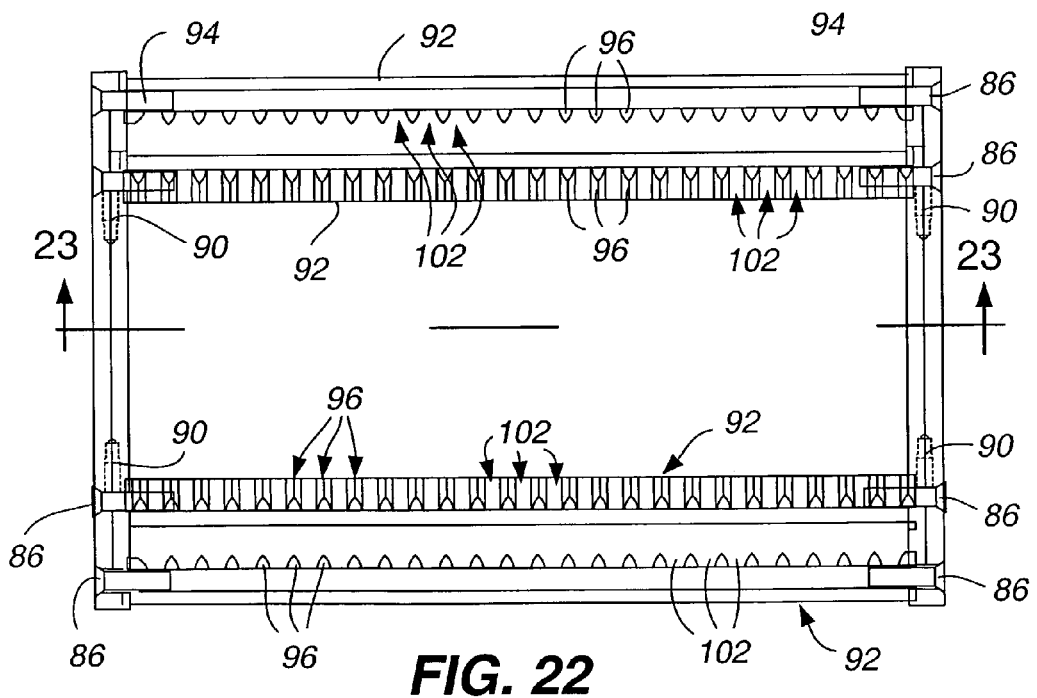

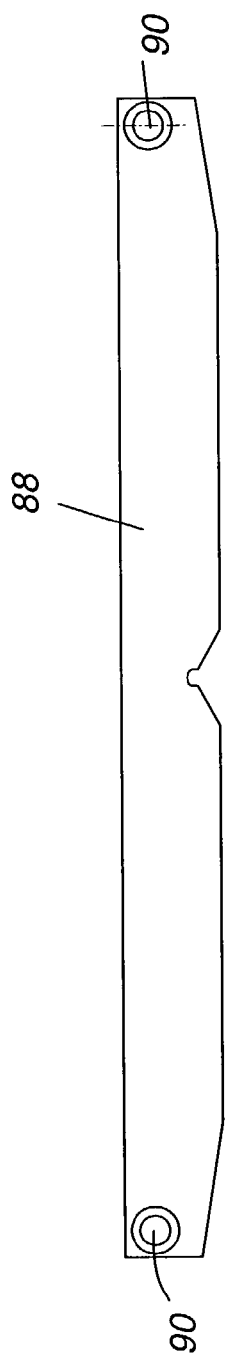
FIG. 26
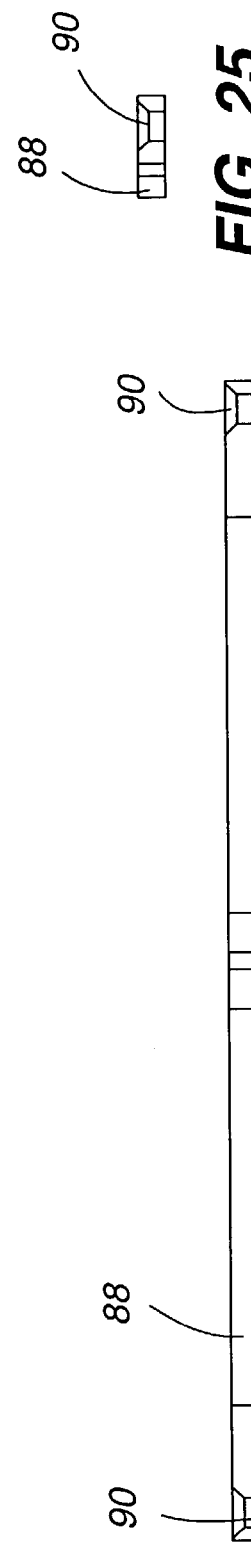
FIG. 25
FIG. 24

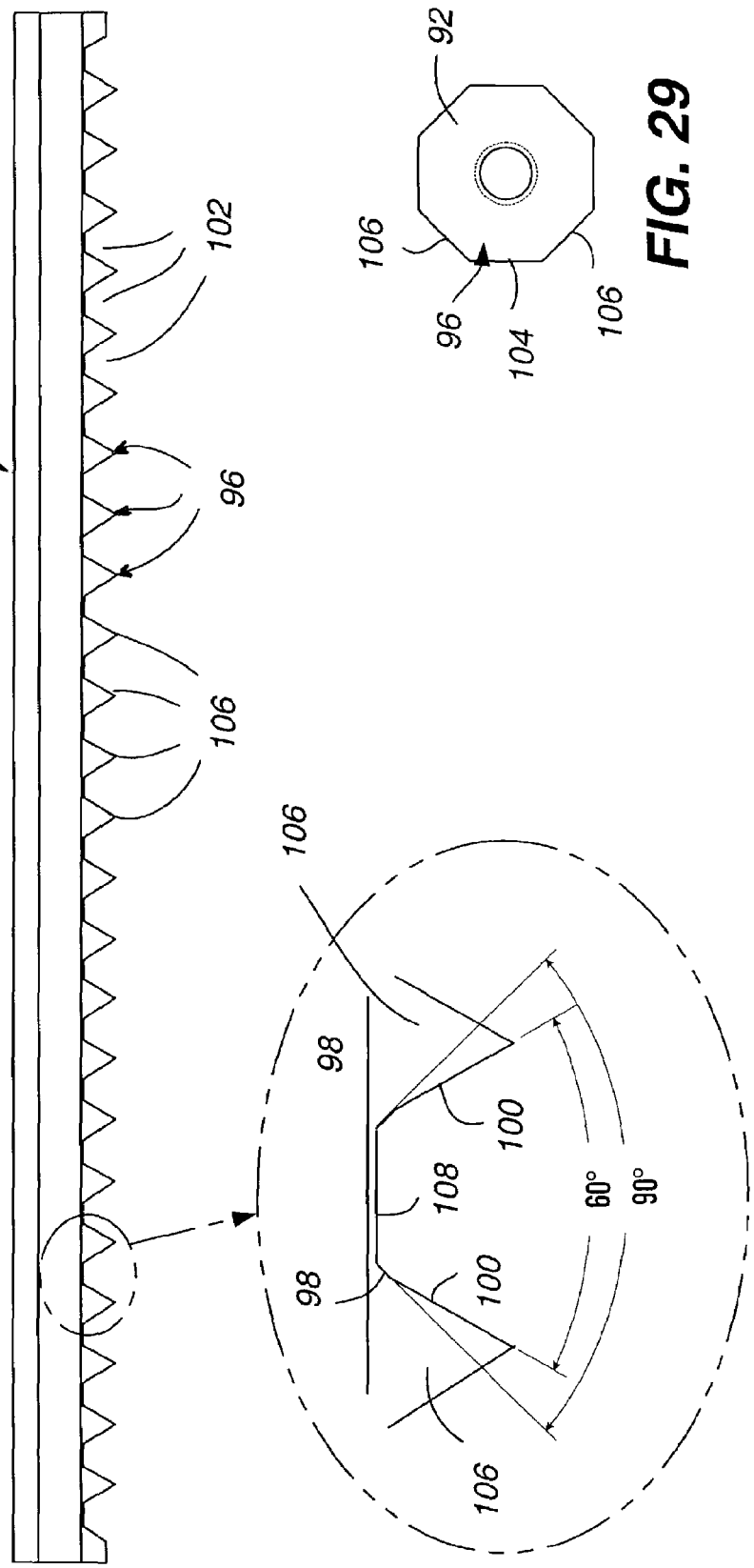

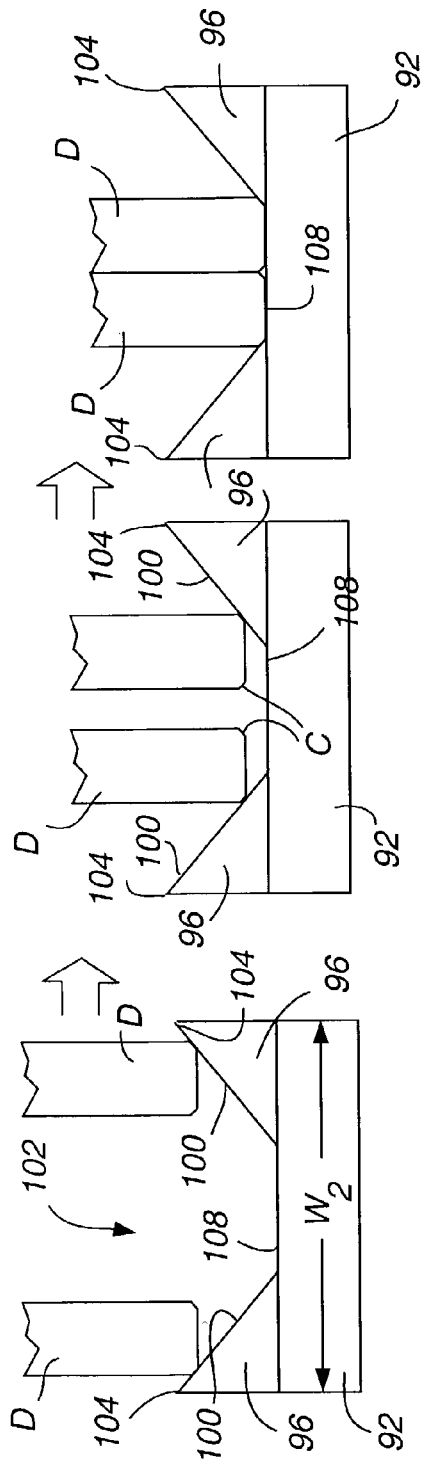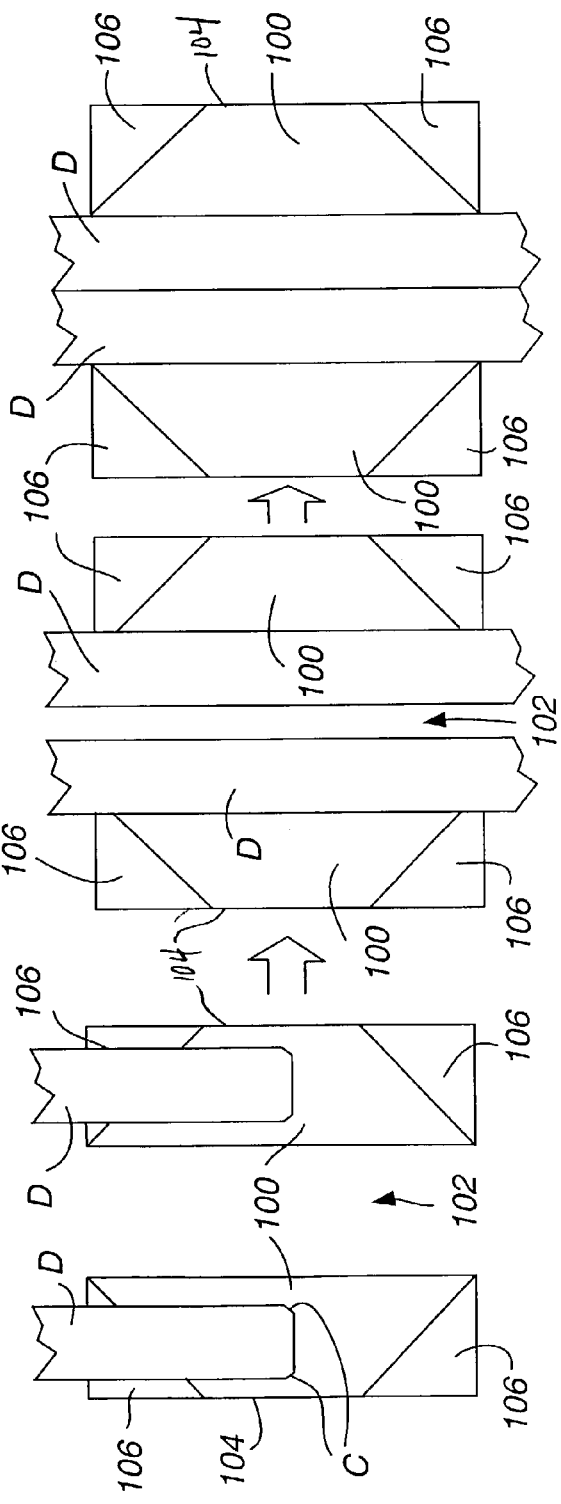

METHOD OF MERGING TWO DISKS CONCENTRICALLY WITHOUT GAP BETWEEN DISKS

CROSS REFERENCE TO RELATED APPLICATIONS

Priority is claimed from U.S. Provisional Patent Application Ser. Nos. 60/378,972 filed May 9, 2002, and 60/417,668, filed Oct. 10, 2002, which are incorporated by reference herein in their entirety.

The subject matter of the present application is related to the following applications, each of which has a filing date of May 9, 2003: Ser. No. 10/434,550 entitled Single-Sided Sputtered Magnetic Recording Disks to Clasara et al.; Ser. No. 10/435,361 entitled Dual Disk Transport Mechanism Processing Two Disks Tilted Toward Each Other to Grow et al.; Ser. No. 10/435,358 entitled Information-Storage Media With Dissimilar Outer Diameter and/or Inner Diameter Chamfer Designs On Two Sides to Clasara et al.; Ser. No. 10/434,551 entitled Apparatus for Combining or Separating Disk Pairs Simultaneously to Buitron et al.; Ser. No. 10/435,572 entitled Method of Simultaneous Two-Disk Processing of Single-Sided Magnetic Recording Disks to Buitron et al.; Ser. No. 10/435,161 entitled W-Patterned Tools for Transporting/Handling Pairs of Disks to Buitron et al.; Ser. No. 10/435,295 entitled Method for Servo Pattern Application on Single-Side Processed Disks in a Merged State to Valeri; Ser. No. 10/434,547 entitled Method for Simultaneous Two-Disk Texturing to Buitron et al.; Ser. No. 10/435,227 entitled Cassette for Holding Disks of Multiple Form Factors to Buitron et al.; Ser. No. 10/434,546 entitled Automated Merge Nest for Pairs of Magnetic Storage Disks to Crofton et al.; Ser. No. 10/435,293 entitled Apparatus for Simultaneous Two-Disk Scrubbing and Washing to Crofton et al.; Ser. No. 10/435,362 entitled Cassette Apparatus for Holding 25 Pairs of Disks for Manufacturing Process to Buitron et al.; and Ser. No. 10/434,540 entitled Method of Lubricating Multiple Magnetic Storage Disks in Close Proximity to Buitron et al. Each of these applications is incorporated by reference in its entirety as if stated herein.

FIELD OF THE INVENTION

The present invention is directed to various apparatus and methods for handling single-sided hard memory disks. More specifically, it relates to methods and apparatus employed in merging disks into pairs of disks that are concentrically contact merged. The present methods and apparatus for handling disk pairs can be utilized in most any context requiring positioning of pairs of disks in a contact merge orientation.

BACKGROUND OF THE INVENTION

Hard disk drives are an efficient and cost effective solution for data storage. Depending upon the requirements of the particular application, a disk drive may include anywhere from one to eight hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

Typically, hard memory disks are produced with functional magnetic recording capabilities on both sides or surfaces of the disk. In conventional practice, these hard disks are produced by subjecting both sides of a raw material substrate disk, such as glass, aluminum or some other suitable material, to numerous manufacturing processes. Active materials are deposited on both sides of the substrate disk and both sides of the disk are subject to full processing such that both sides of the disk may be referred to as active or functional from a memory storage stand point. The end result is that both sides of the finished disk have the necessary materials and characteristics required to effect magnetic recording and provide data storage. These are generally referred to as double-sided process disks. Assuming both surfaces pass certification testing and have no defects, both sides of the disk may be referred to as active or functional for memory storage purposes. These disks are referred as double-sided test pass disks. Double-sided test pass disks may be used in a disk drive for double-sided recording.

Conventional double-sided processing of hard memory disks involves a number of discrete steps. Typically, twenty-five substrate disks are placed in a plastic cassette, axially aligned in a single row. Because the disk manufacturing processes are conducted at different locations using different equipment, the cassettes are moved from work station to work station. For most processes, the substrate disks are individually removed from the cassette by automated equipment, both sides or surfaces of each disk are subjected to the particular process, and the processed disk is returned to the cassette. Once each disk has been fully processed and returned to the cassette, the cassette is transferred to the next work station for further processing of the disks.

More particularly, in a conventional double-sided disk manufacturing process, the substrate disks are initially subjected to data zone texturing. Texturing prepares the surfaces of the substrate disks to receive layers of materials which will provide the active or memory storage capabilities on each disk surface. Texturing may typically be accomplished in two ways: fixed abrasive texturing or free abrasive texturing. Fixed abrasive texturing is analogous to sanding, in which a fine grade sand paper or fabric is pressed against both sides of a spinning substrate disk to roughen or texturize both surfaces. Free abrasive texturing involves applying a rough woven fabric against the disk surfaces in the presence of a slurry. The slurry typically contains diamond particles, which perform the texturing, a coolant to reduce heat generated in the texturing process and deionized water as the base solution. Texturing is typically followed by washing to remove particulate generated during texturing. Washing is a multi-stage process and usually includes scrubbing of the disk surfaces. The textured substrate disks are then subjected to a drying process. Drying is performed on an entire cassette of disk drives at a time. Following drying, the textured substrate disks are subjected to laser zone texturing. Laser zone texturing does not involve physically contacting and applying pressure against the substrate disk surfaces like data zone texturing. Rather, a laser beam is focused on and interacts with discrete portions of the disk surface, primarily to create an array of bumps for the head and slider assembly to land on and take off from. Laser zone texturing is performed one disk at a time. The disks are then washed again. Following a drying step, the disks are individually subjected to a process which adds layers of material to both surfaces for purposes of creating data storage capabilities. This can be accomplished by sputtering, deposition or by other techniques known to persons of skill in the art. Following the addition of layers of material to each surface, a lubricant layer typically is applied.

The lubrication process can be accomplished by subjecting an entire cassette of disks to a liquid lubricant; it does not need to be done one disk at a time. Following lubrication, the disks are individually subjected to surface burnishing to remove asperities, enhance bonding of the lubricant to the disk surface and otherwise provide a generally uniform finish to the disk surface. Following burnishing, the disks are subjected to various types of testing. Examples of testing include glide testing to find and remove disks with asperities that could affect flying at the head/slider assembly and certification testing which is writing to and reading from the disk surfaces. Certification testing is also used to locate and remove disks with defects that make the surface unuseable for data storage. The finished disks can then be subjected to a servo-writing process and placed in disk drives, or placed in disk drives then subjected to servo-writing. The data zone texturing, laser zone texturing, scrubbing, sputtering, burnishing and testing processes are done one disk at a time, with each surface of a single disk being processed simultaneously.

Although the active materials and manufacturing processes, by their nature, are difficult and expensive to employ, over the years, the technology used to manufacture hard memory disks has rapidly progressed. As a result, the density of information that can be stored on a disk surface is remarkable. Indeed, double-sided test pass disks used in personal computers have much greater storage capacity than most consumers require during the useful life of the computer. Consumers thus are forced to pay substantial amounts for excess storage capacity and the components to access the excess storage capacity. This has caused some disk drive manufacturers, in some current applications, to manufacture and sell disk drives which utilize only one side of a double-sided test pass disk for storage purposes or which use the good side of a double-sided process disk where one surface passed certification testing and the second surface failed. In either case, the second surface, despite being fully processed, is unused. However, the disk drive manufacturer reduces its cost by eliminating the mechanical and electrical components needed to access the unused disk surface. These disk drives are referred to as single-side drives and are typically used in low-end or economy disk drives to appeal to the low cost end of the marketplace. Although this approach may reduce some cost, it does not reduce the wasted cost of manufacturing the unused storage surface of each disk. Thus, substantial savings can be achieved by not only manufacturing disks with a single active or functional side, but doing so in a cost-effective manner.

In contrast to a double-sided disk, a single-sided disk has only one functional memory surface with active recording materials. It is not a double-sided process disk where one side is not accessed or where one side has failed testing. Rather, manufacturing processes are applied in a controlled manner only to one side of the disk using unique single-sided processing techniques. In contrast to conventional double-sided disks, active recording materials are only applied to, and full processing is only conducted on, one side of the disk. Thus, substantial savings are achieved by eliminating processing the second side of each disk.

Additionally, the present invention achieves advantages by utilizing conventional double-sided disk manufacturing equipment and processes, with limited modification. The present invention enables simultaneous processing of two substrate disks through the same equipment and processes used to manufacture double-sided disks. Simultaneously processing two substrate disks results in the production of two single-sided disks in the same time and using essentially the same equipment as currently is used in the production of one double-sided disk. However, each single-sided disk has only a single active or functional surface. For illustrative purposes FIG. 1 shows a side-by-side schematic representation of the processing of one double-sided disk $D_d$, depicted on the left side of FIG. 1, versus the simultaneous processing of two single-sided disks $D_s$, depicted on the right side of FIG. 1. In each case, the double-sided disk or the two single-sided disks are subjected to the same process steps 1 through N, but the single-sided disk processing produces two disks in the same time the double-sided disk processing produces one disk.

A benefit provided by simultaneous single-sided processing of disks is a substantial cost savings achieved by eliminating the application of materials to and processing of one side of each disk. A further, and potentially significant cost savings can be achieved by utilizing existing double-sided disk processing equipment, with limited modification, to process pairs of single-sided disks. A still further benefit is a substantial increase in production (or reduction in processing time depending upon perspective). By utilizing existing double-sided disk processing equipment, approximately twice the productivity of a conventional double-sided production process is achieved (on the basis of numbers of disks produced) in the production of single-sided disks. Moreover, these increased productivity levels are achieved at approximately the same material cost, excepting the substrate disk, as producing half as many double-sided disks.

The simultaneous processing is achieved by combining two substrate disks together into a substrate disk pair or disk pair. A disk pair is two substrate disks that are oriented in a back-to-back relationship with the back-to-back surfaces either in direct physical contact or closely adjacent with a slight separation. The separation can be achieved with or without an intervening spacer. The substrate disk pair progresses through each process step in much the same way as one double-sided disk, but with only the outwardly facing surface of each disk in the pair being subjected to the full process. Thus, the outwardly facing surface of each pair becomes the active or functional surface and the inwardly facing surface of each pair remain inactive or non-functional.

For convenience and understanding, the following terms will have the definitions set forth:

a) "R-side" and "L-side" refer to the active side and inactive side of a disk, respectively. R-side is the side that does or will have active recording materials and memory capability. The R-side may also be referred to as the active or functional side. The L-side is the side that has little or no active recording materials or memory capabilities; it is non-functional or inactive from a data storage stand point.

b) "Merge" means to bring two disks closer together to form a pair of disks, a disk pair or a substrate pair.

c) "Demerge," conversely, means that a merged pair of disks is separated from each other.

d) "Disk" means a finished memory disk and all predecessor configurations during the manufacturing process starting with a substrate disk and progressing to a finished memory disk, depending upon the context of the sentence in which it is used.

e) "Disk pair" or "substrate pair" means two disks positioned in contact merge, gap merge or spacer merge orientation.

f) "Double-sided disk" means a single disk which has been subjected to double-sided processing, whether or not both sides of the disk have passed testing or only one side has passed testing.

g) "Gap merge" means a pair of disks that have been merged, but a space is maintained between the two merged disks. One or more spacers may or may not be used to maintain the gap or space. Gap merge includes both concentric and non-concentric merge. It should be understood that there is no precise dimension or limit to the space between the disks that causes them to be gap merged. Gap merge also includes the situation where the gap between the disks gradually decreases from one perimeter edge to the opposite perimeter edge of the disks when the two disks are angled toward each other. An example is when the bottom perimeter edges of the disks are spaced apart and the upper perimeter edges are in contact.

h) "Single-sided disks" means a single disk which has been subjected to single-side processing, where only one surface of the disk is fully processed.

i) "Spacer merge" means a spacer body is used to create spacing between two gap-merged disks.

j) "Contact merge" means a merged pair of disks where the inside surface of each disk is in contact with the inside surface of the other disk. Contact merge includes concentric and non-concentric merge.

k) "Concentric merge" means that two merged disks have the same axis and, assuming the two disks have the same outside diameter and inside diameter (as defined by the center aperture), their outer and inner perimeter edges are aligned.

l) "Concentric contact merge" means a pair of disks that are oriented in both a contact merge and a concentric merge.

m) "Non-concentric merge" or "off-centered merge" means the two merged disks are not concentric to each other or their perimeter edges are not aligned.

n) "Non-concentric contact merge" means the two contact merged disks are not concentric to each other or their perimeter edges are not aligned.

Referring to FIG. 2, a cross-section of a pair of gap-merged disks is shown. The R-side (active or functional side) is the outwardly facing surface R of each disk within the pair. The L-side (inactive or nonfunctional side) is the inwardly facing surface L of each disk within the pair. In comparison, a cross-section of a pair of concentric contact merged disks is shown in FIG. 3. The relative orientation of the R-side and L-side of each disk remains the same, however, the L-side of each disk of the pair are in contact and the outer and inner perimeter P of each disk is aligned with the outer and inner perimeter P of the other disk.

A conventional double-sided disk is shown in FIG. 4. The left side surface is referred to as the "A" side and the right side surface is referred to as the "B" side. Both the A and B sides are subjected to processing, including the addition of active or magnetic materials. In contrast, with reference to FIGS. 2 and 3, the R-side of each disk in a pair of disks is oriented on the outside of the pair and is subjected to processing in the same fashion as the A and B sides of a double-sided disk. Conversely, the L-side of each disk in a pair of disks is oriented on the inside of the pair and is not subjected to full processing in the same fashion as the A and B sides of a double-sided disk.

When repositioning a pair of disks into a concentric contact merge orientation, it is possible for the pair of disks to merge non-concentrically. Regardless of how it happens, once merged non-concentrically, it is difficult for the pair of disks to continue through the manufacturing process. For example, if non-concentrically merged, neither the outer edges nor the center aperture of the disks are aligned. It is therefore difficult, if not impossible, to securely engage the disks by the outer edge or central aperture by mechanical means because these edges are not aligned. One or both disks may come loose. For example, it may be desirable to engage a pair of disks at their central aperture with a spindle assembly in order to spin the pair of disks for texturing. If the center apertures are not concentrically aligned, the spindle may only engage a portion of each disk, but not enough of both disks to properly secure them. As a result, during spinning the disks may come loose or may wobble, thereby negatively effecting the texturing process. Similar adverse effects can occur during scrubbing, testing or servo writing. In such circumstances, it may be necessary to remove the pair of disks from the manufacturing process and scrap them. This not only lowers the production yield but, depending upon where in the manufacturing process it occurs, it can cause a portion of the process to be shut down while the disks are removed. Because of the requisite, and in some cases extreme, cleanliness of disk manufacturing processes, intervention to address the problem can also compromise the quality of the other disks in the same processing batch.

Similarly, non-concentric contact merge can occur during transfer of disks into a cassette. Premature contact between adjacent disks can occur at a time when the disks are misaligned, causing the disks to adhere in a non-concentric contact merge orientation. Such a situation can occur following lubrication, for example, due to the capillary effect created between disks as the lubricant drains away. In any case, non-concentrically merged disks cannot usually be separated without compromising the quality of the disks or the cleanliness of the process where the problem occurs.

SUMMARY OF THE INVENTION

These and other needs are addressed by the various embodiments and configurations of the present invention. The present invention is generally directed to methods and apparatus for concentrically merging pairs of single-sided disks. In one embodiment, a cassette is configured to position disks into pairs of disks having a concentric contact merge orientation. The inside surface of the cassette side walls have at least one row of ribs or ribs configured to facilitate a concentric contact merge orientation. Adjacent ribs are separated by a distance equal to the approximate width of two single-sided disks. This creates a groove or channel for pairs of disks. Each rib is also generally triangular in cross-section. In other words, the side walls of each rib angle together to form a ridge along the uppermost part of each rib. The result is that the side walls of adjacent ribs create an inclined surface or ramp at the edge of each channel to facilitate a smooth merging of disk pairs into a concentric contact merge orientation.

In a second embodiment, the upper portions of each rib, positioned nearest the open top of the cassette, may be further configured to create a widened entry way into the channel formed between adjacent ribs. More specifically, the side walls of each rib are angled inwardly to not only form a raised ridge, as addressed above, but to form a pointed or knife-like leading edge. This further facilitates smoothly positioning the disks in concentric contact merge pairs.

In a third embodiment, the cassette is constructed from modular components. Modularity allows replacement of worn or damaged components without replacing the entire cassette. It also allows for interchangeability of parts, which provides flexibility. For example, if a cassette is configured to hold 25 pairs of disks, the side walls can be interchanged with side walls configured to hold 30 pairs of disks. Similarly, if the size or thickness of the disks being manufactured is scheduled to change, new side walls can be substituted for existing side walls in the cassettes to accommodate the different sized disks. This can be accomplished without maintaining an inventory of differently configured full cassettes. Rather, it can be more efficiently accomplished by maintaining an inventory of specific component pieces.

In any embodiment of the present invention, the exact dimensions of the ribs and grooves is dependent upon the size of the disks being processed. The cassette side walls can be reconfigured to match any change in thickness or diameter of the disks. In addition, the spacing of the ribs relative to each other may be modified to correspond to the manner in which disks are presented to the cassette. For example, in one embodiment, a plurality of disks may be positioned on a mandrel and lowered into the cassette. The ribs on the cassette side walls must be spaced such that each two disks on the mandrel are positioned between each pair of adjacent ribs in the cassette. This is true regardless of how the disks are spaced on the mandrel. Thus, as the mandrel lowers the disks into the cassette, the ribs and grooves on the inside surface of the cassette side walls will guide the disks into pairs, with each pair in a concentric contact merge orientation.

The present invention also affords numerous benefits. For example, a benefit provided by the present invention is an increased output in the production of finished disks achieved by processing multiple pairs of single-sided disks simultaneously. Another benefit is that, with limited modifications, the present invention can utilize existing processing equipment originally designed and built to process double-sided disks for the processing of pairs of single-sided disks. By utilizing existing equipment, designed for example to handle 25 double-sided disks, the present invention can handle 25 pairs of disks (50 total) simultaneously. This is a one-hundred percent increase in the handling and processing of disks compared to conventional double-sided disk processing. It also results in substantial capital equipment savings which would otherwise be spent modifying existing equipment or creating new equipment for processing single-sided disks when such expenditures are unnecessary given the fact that much of the existing equipment will work.

The above-described embodiments and configurations are not intended to be complete nor exhaustive. As will be appreciated, other embodiments of the invention are possible utilizing, alone or in combination, one or more features set forth above or described below.

BRIEF DESCRIPTION OF THE DRAWINGS

FIG. 22 is a top view of the cassette of FIG. 20.

FIG. 23 is a cross-section of the cassette of FIG. 20 taken along line 23-23 of FIG. 22.

FIG. 24 is a top elevation view of a base wall member of the cassette of FIG. 20.

FIG. 25 is an end elevation view of the base wall member shown in FIG. 24.

FIG. 26 is a front elevation view of the embodiment shown in FIG. 24.

FIG. 27 is a top elevation view of a side wall member of the cassette shown in FIG. 20.

FIG. 28 is an enlarged view of a portion of the side wall of FIG. 27.

FIG. 29 is an end elevation view of the embodiment shown in FIG. 27.

FIGS. 30A, B and C are a sequence of partial top elevation views showing a pair of disks interacting with adjacent ribs of the side wall member of the cassette of FIG. 20.

FIGS. 31A, B and C are a sequence of partial front elevation views corresponding with FIGS. 30A, B and C.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

Figure 5:
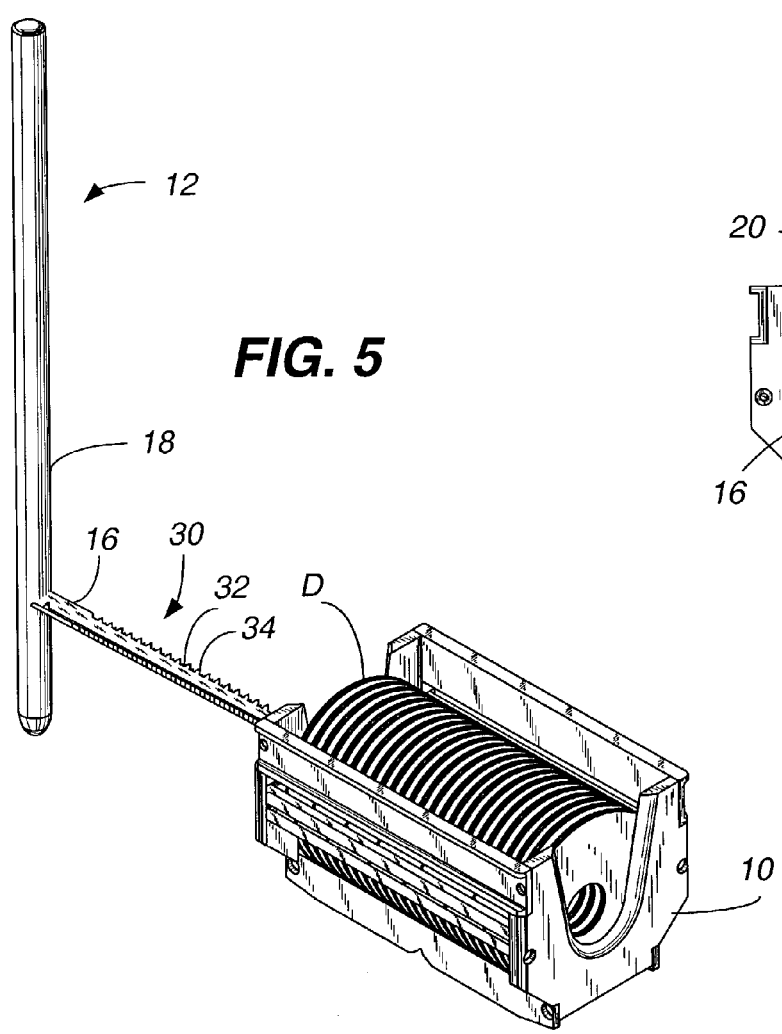
FIG. 5 is a perspective of one embodiment of the mandrel of the present invention prior to insertion through the center aperture of a plurality of gap merge disks in a cassette.

At some point during the manufacture of single-sided hard memory disks, the disks will need to be repositioned into pairs having a concentric contact merge orientation. FIG. 5 shows a single row of disks D axially aligned in a cassette 10 or other suitable container.

Although the disks are illustrated in a gap merge orientation, they could be equally spaced within the container or in some other orientation. The spacing between the disks may vary depending upon the thickness and size of disks as would be appreciated by a person of skill in the art. The spacing may also vary depending upon where in the overall manufacturing process the desired merger is to occur. For example, following lubrication, in which the disks have some space between them to allow the lubricant to access both surfaces of the disk, it may be desirable to position the disks in pairs, in a concentric merge orientation. This is because the likely process following lubrication is tape burnishing, in which the disks are preferably in a concentric contact merge orientation.

The embodiment discussed herein will be in the context of 95-millimeter diameter disks having a 0.050 inch thickness. It should be appreciated that the present invention can be utilized with disks of different sizes.

Figure 7:
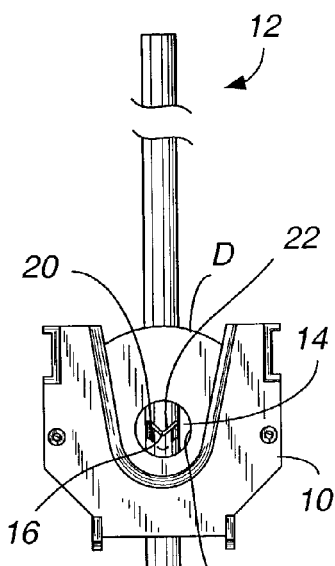
FIG. 7 is a front elevation view of the embodiment of FIG. 5.
Figure 6:
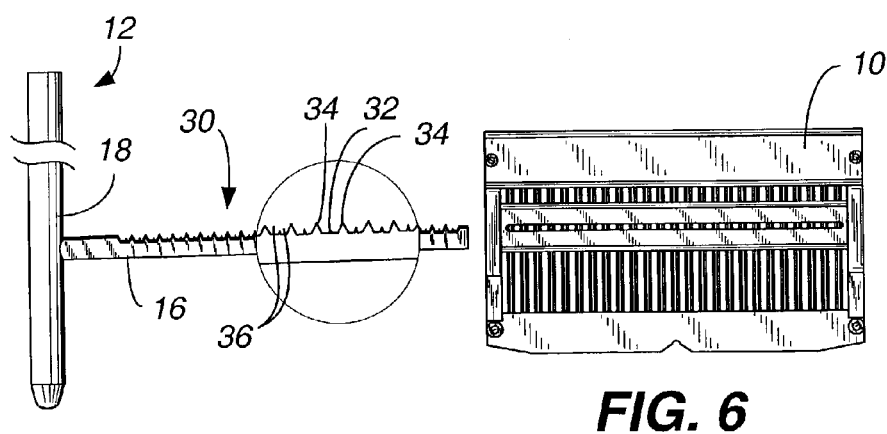
FIG. 6 is a side elevation view of the embodiment of FIG. 5, further magnifying a portion of the mandrel.
Figure 9:
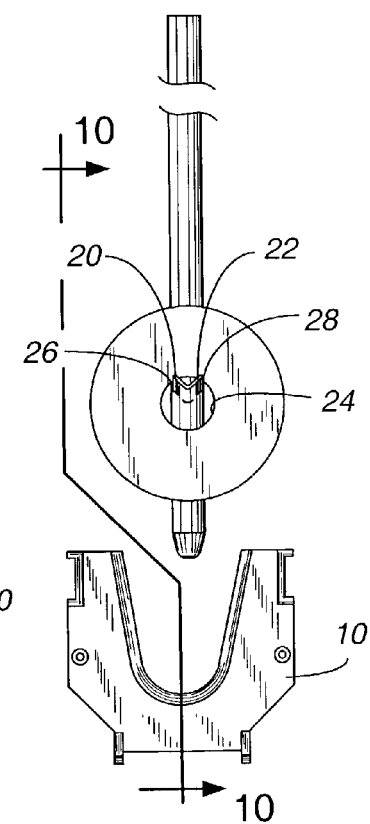
FIG. 9 is a front elevation view of the embodiment of FIG. 8.
Figure 10:
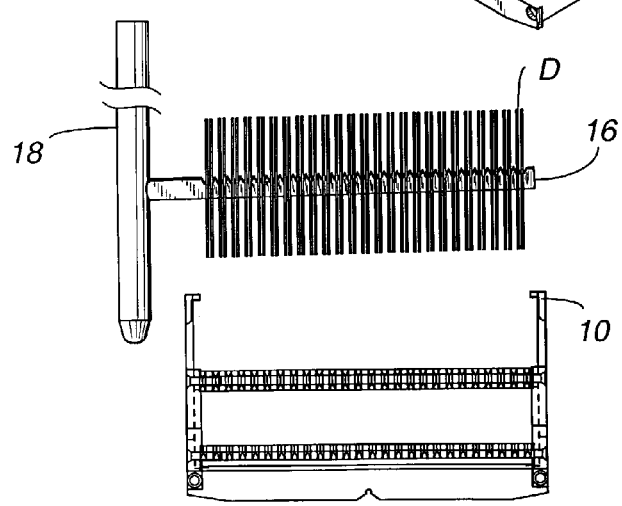
FIG. 10 is a side view of the embodiment of FIG. 8 taken along line 10-10 of FIG. 9, but showing a different cassette embodiment in cross-section.
Figure 11:
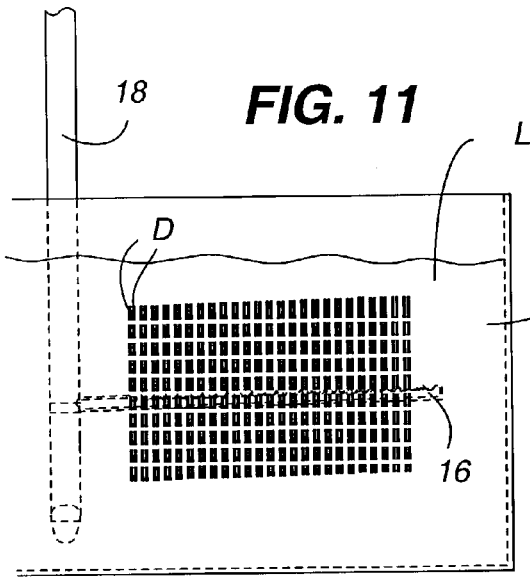
FIG. 11 is a side elevation view of a plurality of pairs of gap merge disks seated on a mandrel and positioned in a lubrication tank.
Figure 12:
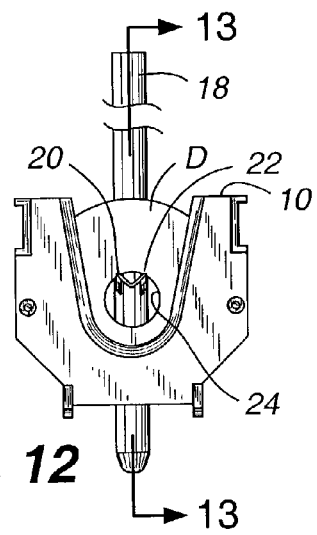
FIG. 12 is a front elevation view of one embodiment of the mandrel in the present invention, returning a plurality of lubricated disks to a contact merge cassette.

A mandrel 12 engages all of the disks D in a cassette 10 via the center aperture 14. As shown in FIGS. 5-7, one embodiment of the mandrel 12 comprises an elongate member 16 extending from a support post 18. The elongate member 16, shown in FIGS. 7 and 9, is M-shaped to provide two contact points 20 and 22 with the interior edge 24 of the disks. The two side walls 26 and 28 of the elongate member provide structural rigidity. Alternatively, as shown in FIGS. 5 and 6, the elongate member 16 may be V-shaped by eliminating the two side walls. In either case, the two contact points 20 and 22 remain. The elongate member 16 is preferably disposed at an upwardly inclined angle from the main support post. The preferred angle of incline is approximately two degrees above horizontal. The inclined angle helps reduce lubrication ripples on the surfaces of the disks which can occur during draining of the lubricant from the tank or removal of the disks following lubrication.

Figure 1:
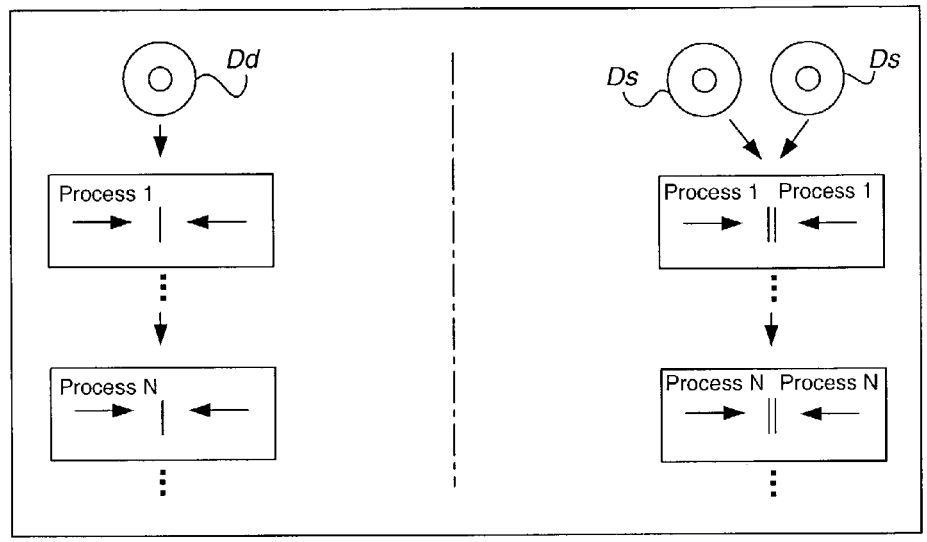
FIG. 1 is a schematic of a double-sided disk manufacturing process, on the left, and a schematic of a single-sided disk manufacturing process, on the right.
Figure 2:
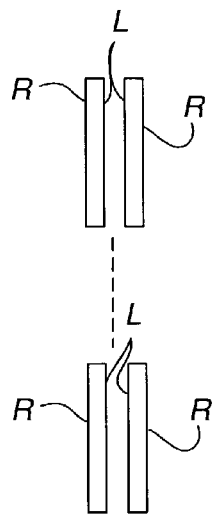
FIG. 2 is a cross-section of a pair of gap merge disks.
Figure 3:
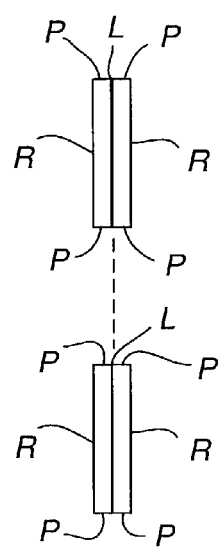
FIG. 3 is a cross-section of a pair of concentric contact merge disks.
Figure 4:
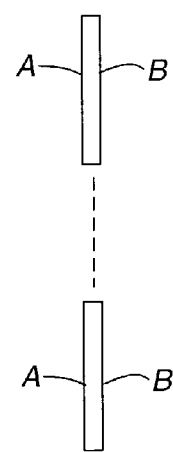
FIG. 4 is a cross-section of a conventional double-sided process disk.
Figure 8:
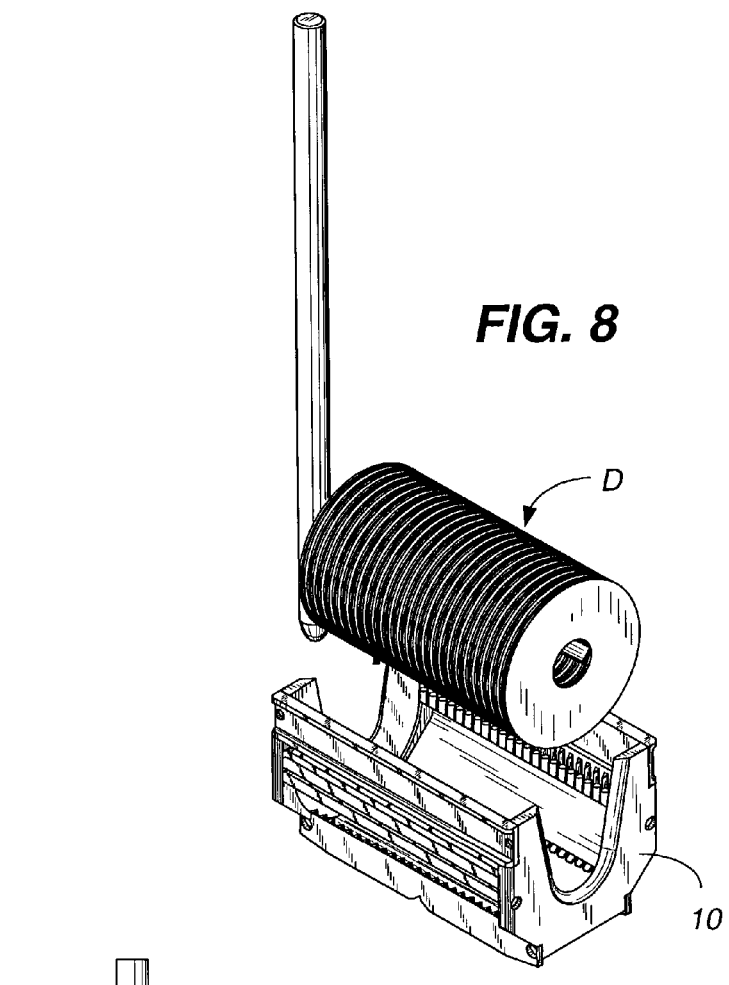
FIG. 8 is a perspective view of one embodiment of the mandrel of the present invention holding a plurality of gap merge pairs of disks above a cassette.

As seen in FIGS. 5 and 6, a row of ribs 30 are disposed on the upper two edges of the mandrel with each row comprising a small rib 32 disposed between a pair of larger ribs 34. This arrangement of ribs maintains a gap merge orientation of the disks. As shown in FIGS. 5-10, the elongate portion 16 of the mandrel 12 is inserted through the center aperture 14 of the disks and accurately positioned such that the two rows of ribs 30 align with the spaces between the disks. More specifically, there is a larger space between pairs of disks than between the two disks of each pair. The small ribs are aligned with the gap formed between the disks comprising each pair and the large ribs are aligned with the space between each pairs of disks. Once fully and accurately positioned inside the apertures of the disks, the mandrel 12 raises until the interior edge 24 of each disk is positioned in the channel 36 formed between the successive ribs 30. As shown in FIG. 8, further lifting raises the disks from the cassette 10. The pairs of disks shown in FIGS. 5, 6, 8 and 10 are in a gap merge orientation (see FIG. 2.)

Figure 16:
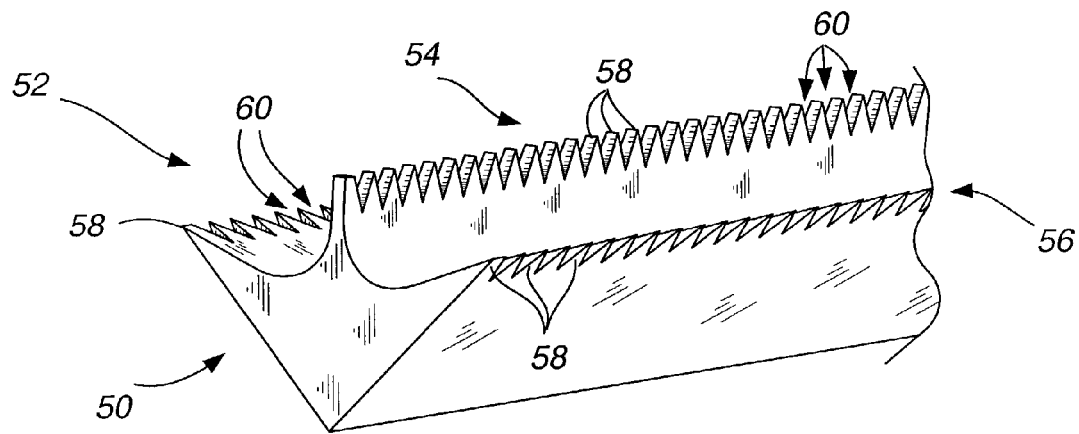
FIG. 16 is a partial perspective view of a second embodiment of the mandrel of the present invention.
Figure 17:
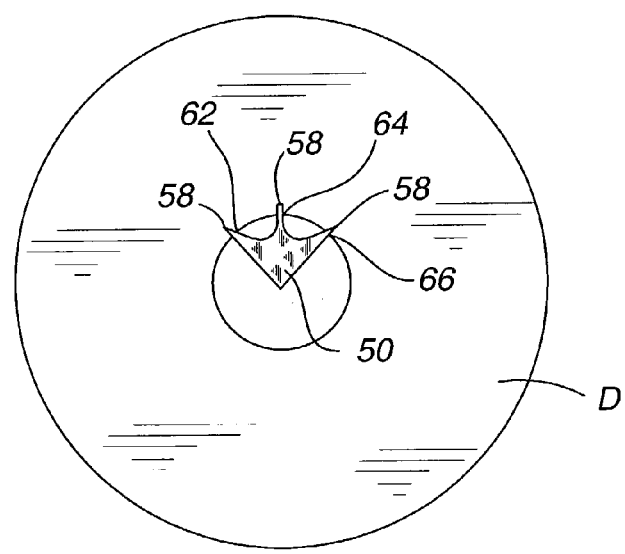
FIG. 17 is a front elevation view of the mandrel of FIG. 16 engaging a disk.
Figure 18:
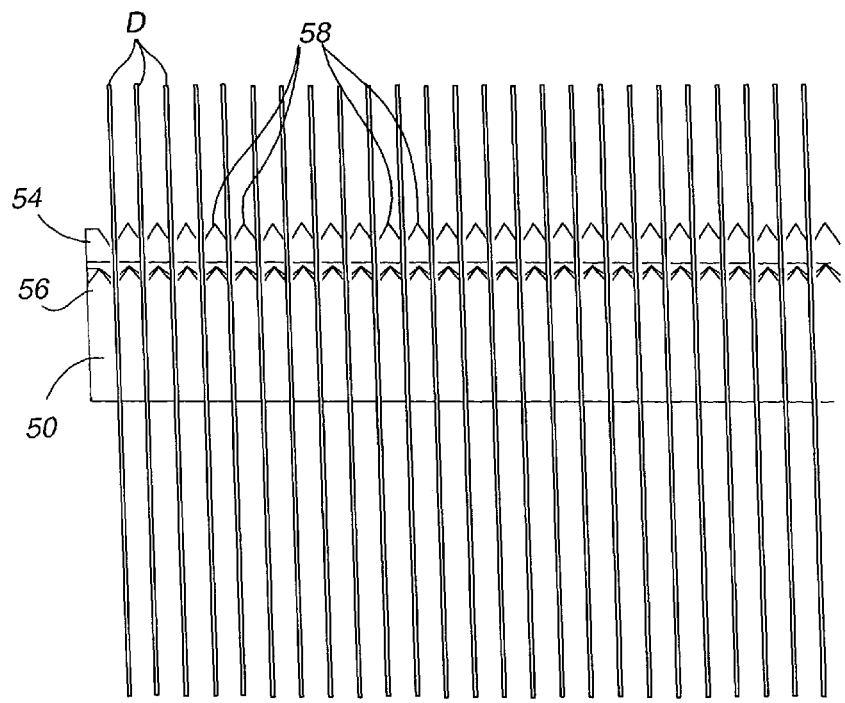
FIG. 18 is a side elevation view of a plurality of evenly spaced disks seated on the mandrel of FIG. 16.

An alternative to the V or M-shaped mandrel design is a three-prong mandrel design shown in FIGS. 16-19. The three-prong mandrel 50 applies equal contact pressure at three different contact points along the inner circumference of a disk as opposed to two-prong mandrel designs. The three-pronged mandrel 50 may be configured to create equal spacing between the disks, a gap merge orientation, or any other desired orientation. The embodiment illustrated in FIG. 18 is configured for equal spacing between disks. In the case of 95 millimeter diameter disks having a 0.050 inch thickness, the space between each disk as shown in FIG. 18 is approximately 0.075 inches.

Figure 19A:
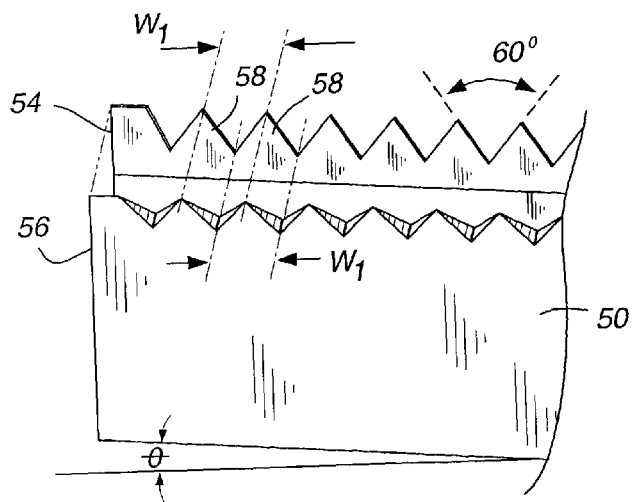
FIG. 19A is a partial perspective view of the distal end of the mandrel of FIG. 16.

As shown in FIGS. 16, 17, the three-pronged mandrel 50 has three rows of ribs 52, 54, 56. The ribs 58 are created by V-shaped notches 60. When handling disks having a 0.050 inch thickness, the distance $W_1$ between the apex of adjacent ribs 58 (or between the apex of adjacent notches) is preferably 0.125 inches. It should be appreciated that the notches 60 or ribs 58 may be cut in different sizes to accommodate different thickness disks. The notches are formed on each of three rows 52, 54, 56 of the mandrel 50 to match the inner diameter radius of the disk as shown in FIG. 17. This creates three contact points, 62, 64, and 66 on the disk, rather than two contact points created with a V or M shaped mandrel. In one embodiment, the outer rows of ribs 52 and 56 are formed at a forty-five degree angle relative to the middle row 54. The mandrel is preferably disposed at an angle $\theta$, shown in FIG. 19A, preferably approximately two degrees. This helps reduce ripples of lubricant forming on the disk surfaces when the lubricant drains from the disks. The preferred angle of each notch 60 is 60 degrees as shown in FIG. 19A. The angle of the notch can also be altered to complement a chamfer formed on the inside edge of the disk at the central aperture. For example, the chamfer angle and notch angle can both be formed at sixty degrees to give enhanced stability to the disks.

Figure 19B:
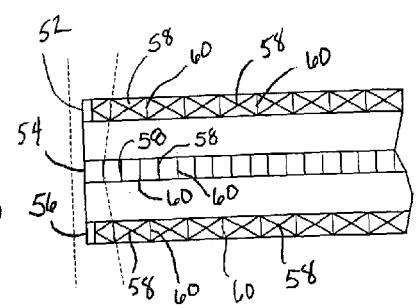
FIG. 19B is a top view of the embodiment of FIG. 19A.
Figure 20:
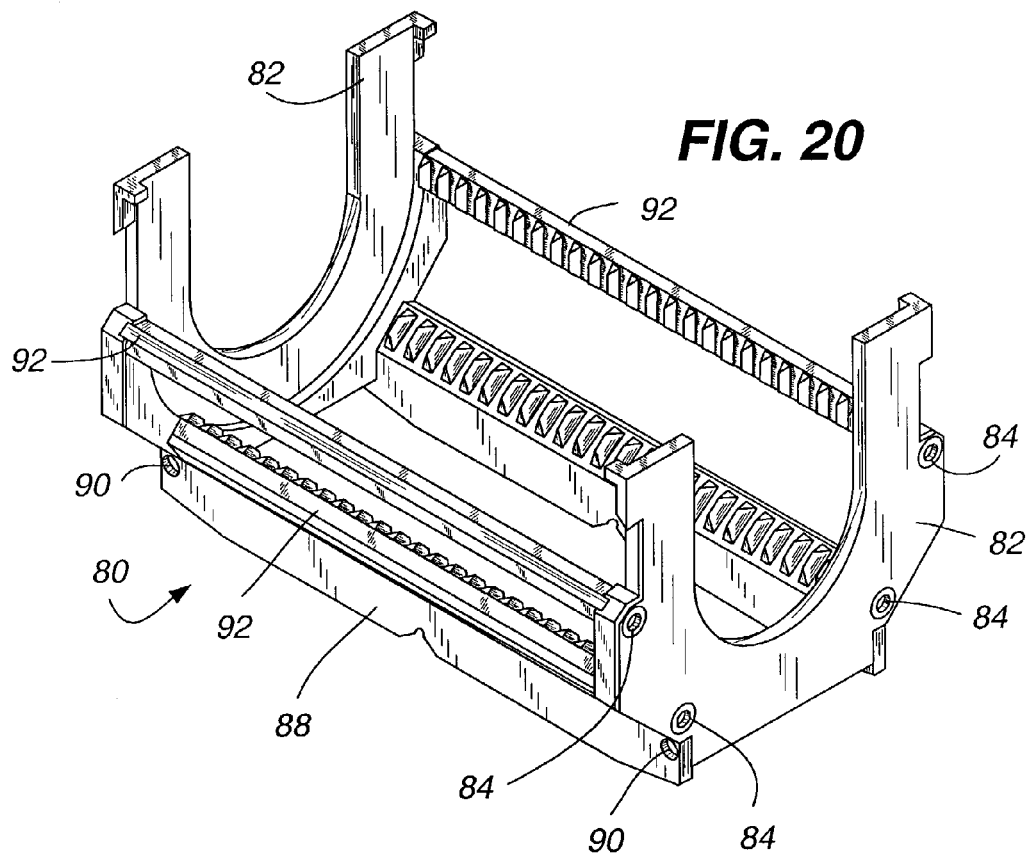
FIG. 20 is a perspective of one embodiment of a modular cassette configured for concentric contact merge orientation of disk pairs.
Figure 21:
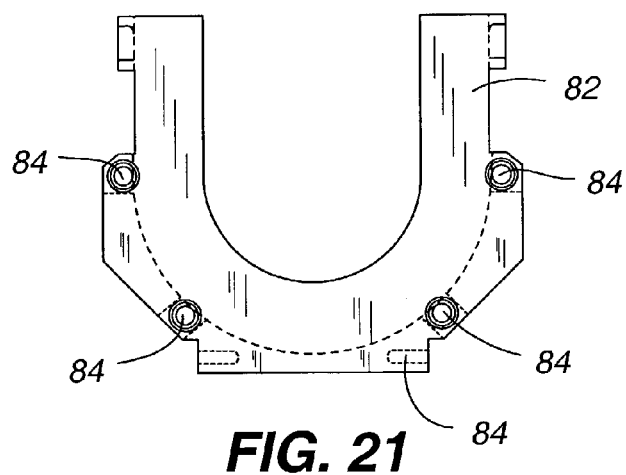
FIG. 21 is an end view of the cassette of FIG. 20.

Because of the incline or tilt angle of the mandrel, in order to maintain vertical orientation of the disks on the mandrel, the center row of teeth 54 must be slightly forward of the outer rows of teeth 52, 56. This is seen in FIG. 19B. In addition, for optimum stability, the notches on all three rows of teeth should be rotated forward relative to the mandrel, by the same angle as the tilt angle. The tilt angle can be between 0.5 and 10 degrees above horizontal.

In the two-blade configuration, the disks are more susceptible to swinging on the mandrel 12 and potentially dislodging and falling. The added third or center row of ribs 54 in the three-prong mandrel 50 inhibits disk swing and reduces the risk of the disks coming into contact with each other during processing by more rigidly securing the disks on the mandrel.

Turning to FIGS. 20-29, one embodiment of a disk receiving cassette 80 is shown. The disk cassette 80 comprises eight pieces. These include two end walls 82 with six apertures 84 for receiving securing elements 86, two base members 88 which interconnect the two end walls 82 and are secured to the end walls through apertures 90 which align with securement apertures 84 in the end walls 80, and four side walls 92 which also interconnect the end walls 82 and are secured to the end walls 82 through similar securement apertures 94. In the preferred version of this embodiment, the four side walls 92, the two end walls 82 and the two base members 88 are identical. This provides modularity and interchangeability. For example, the interchangeability allows the disk manufacturer to maintain an inventory of the side walls 92 to replace individual side walls damaged or worn out during use. The modularity allows side walls configured to hold disks in different orientations to be substituted for each other. Thus, in one embodiment the cassette may be configured to hold disks in a contact merge orientation, and in another embodiment the side walls may be substituted for side walls to hold the disks in a gap merge orientation.

The cassette 80 and its component pieces are preferably made of plastic by injection molding processes. Different plastics, having different characteristics, can be selected depending upon the environment in which the cassette will be used. High performance plastics are preferred. In typical environments such as texturing, cleaning, lubricating, servo writing, testing and general handling of disks around the manufacturing facilities, the plastic may be polyethylene terephthalate (PET), polybutylene terephthalate (PBT) or polyesteresterketone (PEEK). PBT is the easiest to mold, but has the least desirable abrasion characteristics. PET provides better abrasion characteristics. PEEK provides the best abrasion characteristics, is the most durable and can withstand the highest temperatures. It is also the most expensive of the three. It would also be possible to cast, forge, etch or machine the component pieces from metal, although the cost would likely be prohibitive.

In one embodiment, as illustrated in FIG. 29, the side walls 92 may have an octagonal cross-sectional shape. A row of ribs 96 is disposed along one side of the side wall for engaging disks, as is shown in FIGS. 20, 22, 23 and 27. In this embodiment, the ribs 96 have two side surfaces 98, 100 which form channels or grooves 102 for receiving the disks. The grooves 102 are designed to position the pairs of disks in concentric contact merge orientation. The two surfaces 98, 100 are formed at different angles. As shown in FIG. 28, the lower side walls 98 form a first angle of 90 degrees. The 90 degree angle of the lower side walls 98 complement the chamferred outer edges of disks, formed at 45 degrees. These angles may change to accommodate different chamfers. The upper side wall 100 forms an angle of 60 degrees. The 60 degree angle formed by the upper side walls 100 creates a funnel-like opening that facilitates merging of a pair of gap merge disks to a pair that is in a contact merge orientation. These angles may also change to accommodate different sized disks. The upper side walls 100 of each rib 96 also converge to create a ridge line 104 which forms the apex of each rib. Each rib also has an angled front and rear surface 106. The width of the flat base portion 108, together with the incremental additional width provided by the angle of the lower side walls 98, correspond to match the thickness of two disks. Thus, each pair of adjacent ribs 92 hold a disk pair in concentric merge.

The merging of pairs of disks by the configuration of the side walls of a cassette is illustrated in FIGS. 30 and 31. For simplicity in illustration, the side walls of the teeth 96 are depicted as only having one surface 100. Lower surface 98 is not shown. FIG. 30 is a top view, looking down from the top of a cassette at the perimeter edge of a pair of disks D. The chamfer of the disks is designated C in the figures. FIG. 31 is a front view showing the disks moving vertically downwardly into a cassette with ribs 96 positioned behind the disks. The distance $W_2$, shown in FIG. 30A, between the ridge line 104 of two adjacent ribs, is designed to be wider than the thickness of two disks in a gap merge orientation. Thus, if the disks are 0.050 inches thick and the gap is 0.035 inches thick, the distance $W_2$ should be 0.135 inches or wider.

In operation, the inwardly angled surfaces 100 facilitate movement of the disks toward each other as the disks are lowered into the cassette and contact the surfaces 100. Thus, as the mandrel 12 or 50 lowers the lubricated disks into the cassette 80, the side walls 100 of each side wall 92 act to force the disks together. The disks will slowly move into a concentric contact merge orientation, shown in FIGS. 30C and 31C, as they are lowered into the cassette. Once the disks become fully seated in the cassette, the mandrel can be withdrawn from the center apertures of the disks.

Figure 32:
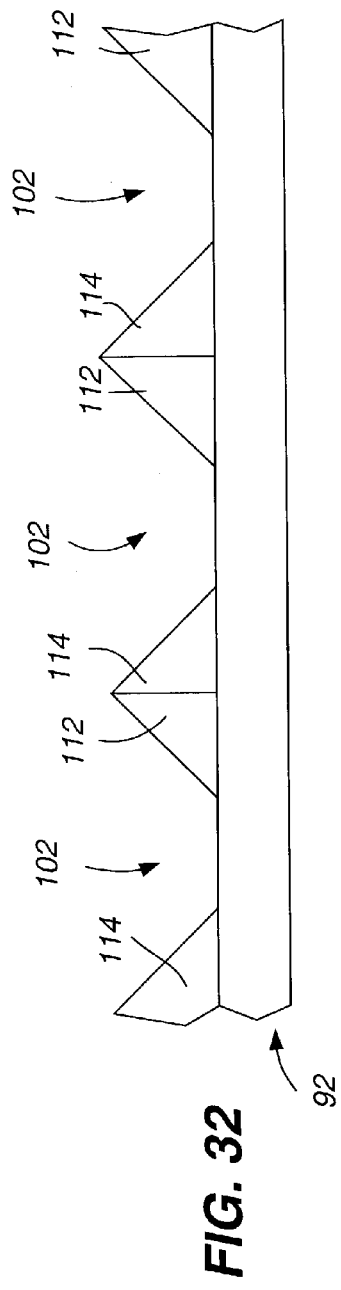
FIG. 32 is a top elevation view of a second embodiment of the side wall member of the cassette shown in FIG. 20.
Figure 33:
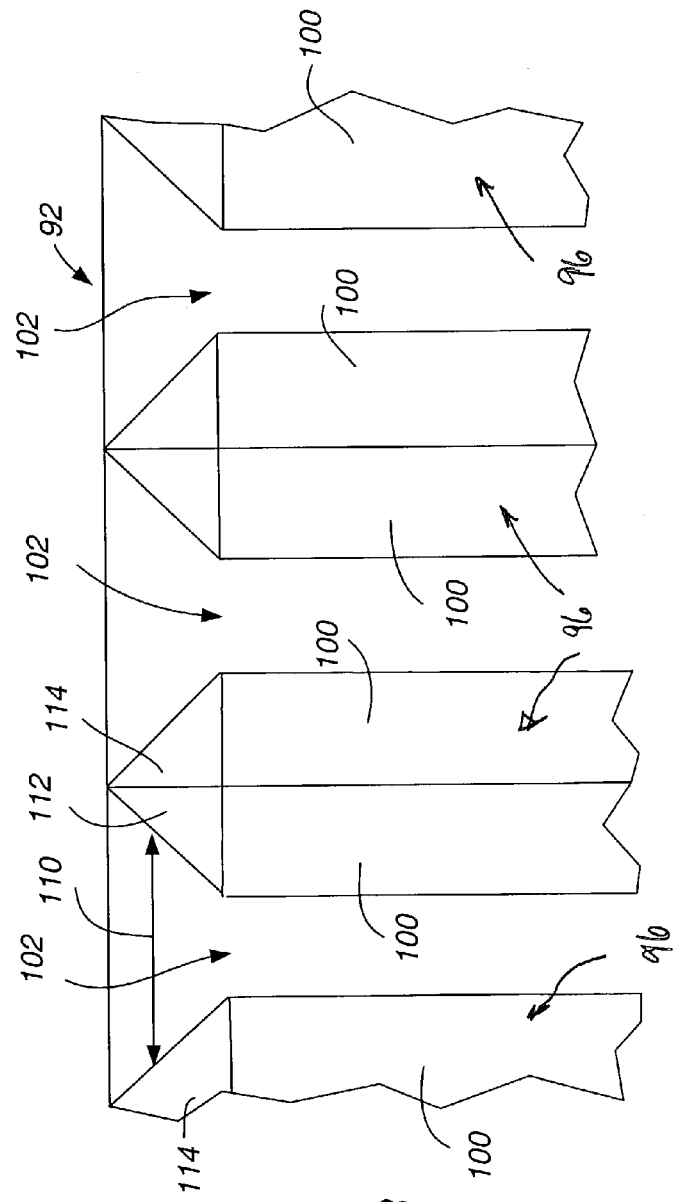
FIG. 33 is a front elevation view of the side wall member of FIG. 32.

In an alternative embodiment, shown in FIGS. 32 and 33, the ribs 96 may also be angled at their leading edges to create a widened entry way 110 not present in the embodiment of FIGS. 30 and 31. The widened entry way, formed by beveled surfaces 112, 114 of each rib 96, further facilitates merging of disks. This widened entry way 110 facilitates movement of two disks into each channel 102 to ensure that disks spaced apart on the mandrel 12 or 50 properly realign into pairs of contact merge disks, with one pair of disks in each channel 102.

Figure 15:
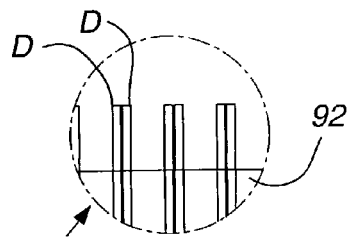
FIG. 15 is a partial exploded view taken from FIG. 13 showing the upper perimeter edges of a few disk pairs.
Figure 13:
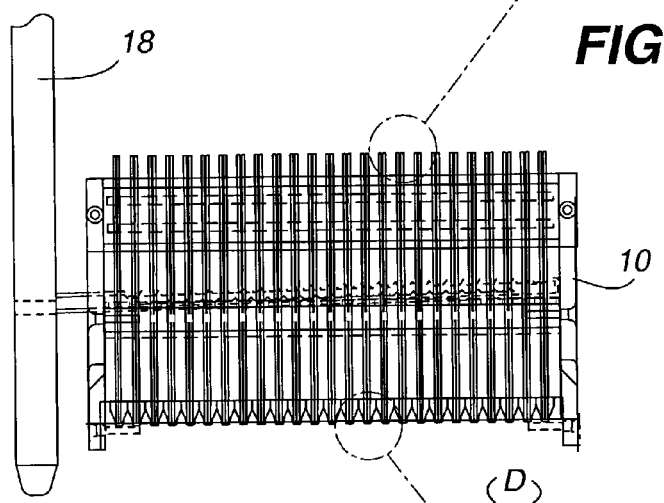
FIG. 13 is a cross-section view of the embodiment shown in FIG. 12 taken along line 13-13 of FIG. 12.
Figure 14:
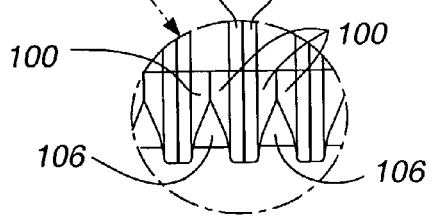
FIG. 14 is a partial exploded view taken from FIG. 13 showing the lower perimeter edges of a few disk pairs.

In much the same way, the pairs of gap merge disks shown in FIGS. 8-11 can be repositioned into a concentric contact merge orientation as shown in FIGS. 13-15. The rows of ribs 96 disposed along the inside of the cassette 10 are sized to force the disks into a contact merge orientation. The ribs have angled side walls 100 which gradually force the disks into contact, which is illustrated in FIGS. 14 and 15.

As stated previously, it should be understood that the receiving cassette can be adapted to position the disks in a gap merge orientation or an evenly spaced orientation. If a gap merge orientation is desired, the cassette shown in FIGS. 20-29 herein, can be replaced, for example, with the cassette shown in co-pending U.S. Application Ser. No. 10/435,161 entitled "W-Patterned Tools for Transporting/Handling Pairs of Disks" filed May 9, 2003, the entirety of which is incorporated herein by reference as if stated herein.

Merging of disks may be further facilitated by use of a merge nest. A merge nest works in association with a disk cassette and assists in merging pairs of disks into a contact merge, gap merge or concentric contact merge orientation. An example of a merge nest is described in co-pending U.S. patent application Ser. No. 10/434,546 entitled "Automated Merge Nest for Pairs of Magnetic Storage Disks", filed May 9, 2003, the entirety of which is incorporated herein by reference as if fully stated herein.

The cassette 80 may be used in various manufacturing processes where pairs of disks are removed from the cassette one pair at a time for processing and returned to the cassette following processing. As each pair is returned, the position of the cassette relative to the processing equipment may be adjusted to facilitate removal of the next pair. Adjustment of the position of the cassette may be accomplished by placing the cassette in a guide or holder which is preprogrammed to adjust the position of the cassette the desired incremental amount. Alternatively, the cassette may include one or more reference or index marks which are used to adjust and align the cassette relative to the processing equipment. The index mark may be a hole or mark on the cassette body or, with available optical systems, an existing feature of the cassette, such as a corner of the end wall or other edge, may serve as the reference mark.

It should also be understood that the present invention will also work with one disk pair at a time. There is no reason, other than for greater throughput, that requires an entire cassette load of disks be merged simultaneously. The cassette design would remain unchanged. Instead of using a mandrel as shown in FIGS. 5 or 16, a mechanism for handling single-sided disk pairs (2 disks) may be used. Such a disk pair mechanism may include a two-disk mandrel design and a two-disk saddle. The saddle is positioned beneath the open bottom of the cassette and moves vertically through the cassette to a position above the open top of the cassette. In its raised position, the lift saddle may receive a pair of disks from a two-disk mandrel and lower them into the cassette, or the mandrel may simply lower the disks into the cassette without use of the lift saddle. This two-disk mechanism is described in co-pending U.S. application Ser. No. 10/434,551 entitled "Apparatus for Combining or Separating Disk Pairs Simultaneously, filed May 9, 2003, the entirety of which is incorporated herein by reference as if fully stated herein.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of manufacturing single-sided hard memory disks, the disks having a central aperture, the method comprising:
    a. providing a movable cassette at a first location;
    b. providing a plurality of disks;
    c. engaging the disks by their central aperture and positioning the disks in the cassette in a parallel axial alignment;
    d. contacting the cassette with the disks and causing the orientation of the disks within the container to change;
    e. moving the cassette to a second location.

2. The method of claim 1, wherein causing the orientation of the disks within the cassette to change comprises positioning the disks in pairs, with each pair of disks in a contact merge orientation.

3. The method of claim 1, wherein changing the orientation of the disks within the cassette comprises placing the disks in pairs with each pair in a gap merge orientation.

4. The method of claim 1, wherein providing a plurality of disks comprises providing a plurality of disks in a parallel axial alignment with the space between each disk being substantially the same.

5. A method of manufacturing single-sided hard memory disks for use in a disk drive, the method comprising:
    a. providing a container, said container having a pair of generally parallel side walls, the inner surface of said side walls having slots for receiving disks, a pair of generally parallel end walls, an open top and an open bottom, and defining an interior volume of space;
    b. substantially simultaneously positioning a first disk pair, comprising a first and second disk, in a first slot in the container in an abutting relationship such that a surface of the first disk is in contact with a surface of the second disk to form a first disk pair;
    c. following positioning of the first disk pair in the first slot, substantially simultaneously positioning a second disk pair, comprising a third and fourth disk, in a second slot in the container in an abutting relationship such that a surface of the third disk is in contact with a surface of the fourth disk to form a second disk pair, wherein the first slot is adjacent to the second slot and positioning the second disk pair causes the second disk pair to be adjacent to the first disk pair with a space between the first and second disk pairs.

6. The method of claim 5, further comprising substantially simultaneously positioning additional disk pairs in the container one pair at a time wherein each additional pair of disks is positioned in the same abutting relationship as the first and second pairs of disks and each pair is positioned in a slot adjacent to and spaced from the last previously placed pair.

7. The method of claim 6, further comprising substantially simultaneously positioning each pair of disks approximately 0.125 inches from an adjacent pair.

8. The method of claim 6, further comprising sequentially positioning 23 additional pairs of disks in the container with each pair of disks being substantially simultaneously positioned in the container.

9. The method of claim 6, further comprising positioning all pairs of disks adjacent an index mark on the container.

10. The method of claim 5, further comprising positioning the first disk pair adjacent an index mark on the container.

11. The method of claim 1, further comprising positioning each pair of disks in a concentric contact merge orientation.

12. The method of claim 5, wherein the hard memory disks include a centrally disposed aperture and wherein positioning a first pair of disks and a second pair of disks comprises engaging said disks at the centrally disposed aperture.

13. A method of manufacturing single-sided hard memory disks, the method comprising:
    a. providing a movable container at a first location;
    b. providing a plurality of disks;
    c. orienting the disks in the container in parallel axial alignment one pair of disks at a time;
    d. as part of step c, orienting the disks of each pair with a surface of one disk abutting a surface of the second disk;
    e. providing a space between each of the pairs of disks;
    f. moving the container to a second location
    g. following step f, separating the disks of each pair.

14. The method of claim 13, wherein each disk has an active surface and an inactive surface, and wherein orienting the disks in pairs further comprises positioning the inactive surface of each disk of the pair facing toward each other and the active surface of each disk facing outwardly of the pair.

15. The method of claim 13, wherein orienting the disks in parallel axial alignment and in pairs comprises positioning a pair of disks every 0.25 inches along the length of the container.

16. The method of claim 13, wherein providing a plurality of disks comprises providing an even number of disks.

17. The method of claim 13, wherein providing a plurality of disks comprises providing 50 disks.

18. The method of claim 13, further comprising providing adjacent marks on the container for locating the position of the container.

19. The method of claim 13, further comprising providing an alignment mark for locating the position of the container adjacent each pair of disks.

20. The method of claim 13, wherein the hard memory disks have a central aperture and wherein orienting the disks in the container in parallel axial alignment one pair of disks at a time comprises engaging the disks at their central aperture.

* * * * *